(12) United States Patent
Hoeger et al.

(10) Patent No.: US 7,553,129 B2
(45) Date of Patent: Jun. 30, 2009

(54) FLOW STRUCTURE FOR A GAS TURBINE

(75) Inventors: Martin Hoeger, Erding (DE); Franz Malzacher, Groebenzell (DE)

(73) Assignee: MTU Aero Engines GmbH, Munich (DE)

( * ) Notice: Subject to any disclaimer, the term of this patent is extended or adjusted under 35 U.S.C. 154(b) by 562 days.

(21) Appl. No.: 11/190,447

(22) Filed: Jul. 27, 2005

(65) Prior Publication Data

US 2006/0024158 A1 Feb. 2, 2006

(30) Foreign Application Priority Data

Jul. 28, 2004 (DE) .................. 10 2004 036 594

(51) Int. Cl.
*F01D 9/02* (2006.01)
(52) U.S. Cl. .............. 415/193; 415/194; 415/209.1; 415/211.2
(58) Field of Classification Search .......... 415/211.2, 415/208.4, 209.3, 193, 194, 195, 209.1, 208.2
See application file for complete search history.

(56) References Cited

U.S. PATENT DOCUMENTS

| | | | | |
|---|---|---|---|---|
| 2,847,822 A | * | 8/1958 | Hausmann | 239/265.27 |
| 2,990,106 A | * | 6/1961 | Craig | 415/194 |
| 5,316,441 A | * | 5/1994 | Osborne | 415/208.4 |
| 6,375,419 B1 | * | 4/2002 | LeJambre et al. | 415/191 |
| 6,905,303 B2 | * | 6/2005 | Liu et al. | 415/142 |
| 7,258,525 B2 | * | 8/2007 | Boeck | 415/209.3 |
| 2004/0101405 A1 | * | 5/2004 | Turner et al. | 415/194 |
| 2005/0175448 A1 | * | 8/2005 | Jacobsson | 415/194 |

* cited by examiner

*Primary Examiner*—Ninh H Nguyen
(74) *Attorney, Agent, or Firm*—Crowell & Moring LLP

(57) ABSTRACT

A flow structure of a gas turbine, in particular for an aircraft engine, in a transitional channel between two compressors or in a transitional channel between two turbines or in a transitional channel of a turbine outlet housing downstream from a low-pressure turbine is disclosed. Supporting ribs are positioned in the transitional channel and spaced a distance apart in the circumferential direction of the transitional channel. At least one guide vane and/or guide rib is positioned between two supporting ribs spaced a distance apart from one another. The flow outlet edge of the guide rib or each guide rib runs upstream from the flow outlet edges of the supporting ribs.

21 Claims, 2 Drawing Sheets

FLOW STRUCTURE FOR A GAS TURBINE

This application claims the priority of German Patent Document No. 10 2004 036 594.6, filed Jul. 28, 2004, the disclosure of which is expressly incorporated by reference herein.

BACKGROUND AND SUMMARY OF THE INVENTION

This invention relates to a flow structure for a gas turbine, in particular for an aircraft engine.

Gas turbines such as aircraft engines usually have multiple compressors, multiple turbines and a combustion chamber. The multiple compressors usually include a low-pressure compressor and a high-pressure compressor; the multiple turbines usually include a high-pressure turbine and a low-pressure turbine. The gas turbine has flow passing through it axially; the low-pressure compressor is situated upstream from the high-pressure compressor, and the high-pressure turbine is situated upstream from the low-pressure turbine. The flow goes from the low-pressure compressor into the high-pressure compressor through a transitional channel between these two compressors. Likewise, such a transitional channel is positioned between the high-pressure turbine and the low-pressure turbine.

It is already known from the prior art that supporting ribs spaced a distance apart may be provided in such transitional channels between two compressors or two turbines in the circumferential direction of the transitional channel. The supporting ribs are used in providing, for example, oil lines and sensors and for receiving forces, which is why the supporting ribs are designed to be relatively thick. There are known supporting ribs in the prior art which are designed to carry but not guide the flow. In addition, there are also known supporting ribs which have a suction side and a pressure side and therefore also assume the function of flow guidance. In particular in the case of supporting ribs that deflect the flow, there is the risk of flow separation and the risk of development of secondary flow, which ultimately results in high flow losses, because of the small height ratio and the relatively great thickness of the supporting ribs in the case of supporting ribs that deflect flow. In addition, this also results in a poor oncoming flow quality for the components situated downstream from the transitional channel in the direction of flow.

Against this background, the present invention is based on the problem of creating a novel flow structure for a gas turbine.

This problem is solved by a flow structure for a gas turbine of the present invention. According to this invention, at least one guide vane and/or guide rib is positioned between two adjacent supporting ribs arranged a distance apart in the circumferential direction of the transitional channel whereby the flow outlet edge of the guide rib or each guide rib runs upstream from the flow outlet edges of the supporting ribs.

With the help of the inventive flow structure, an optimized flow is obtained within the transitional channel, thereby minimizing the risk of the development of flow separation and secondary flow. In addition, there is optimum oncoming flow for a component downstream from the flow arrangement and/or the transitional channel. Flow losses are avoided and the efficiency of the gas turbine is optimized.

The flow inlet edge of the guide rib or each guide rib positioned between two adjacent supporting ribs preferably runs slightly upstream from the flow entrance edges of the supporting ribs and in addition a channel wall bordering the transitional channel on the inside radially and/or a channel wall bordering the transitional channel on the outside radially is also constricted inward in the area of the flow outlet edge of the guide rib or each guide rib positioned between two neighboring supporting ribs.

BRIEF DESCRIPTION OF THE DRAWINGS

Preferred refinements of this invention are derived from the following description. Exemplary embodiments of the invention are illustrated in greater detail on the basis of the drawings without being limited to these embodiments.

DETAILED DESCRIPTION OF THE DRAWINGS

Figure 1:
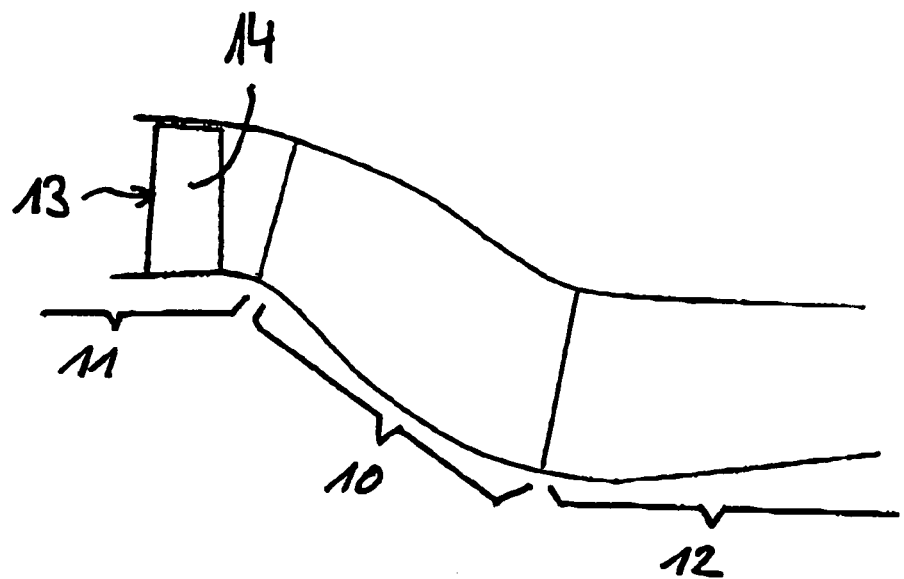
FIG. 1 is a highly schematic diagram of a flow structure of a gas turbine known from the prior art, namely a flow structure for a transitional channel between two compressor stages.
Figure 2:
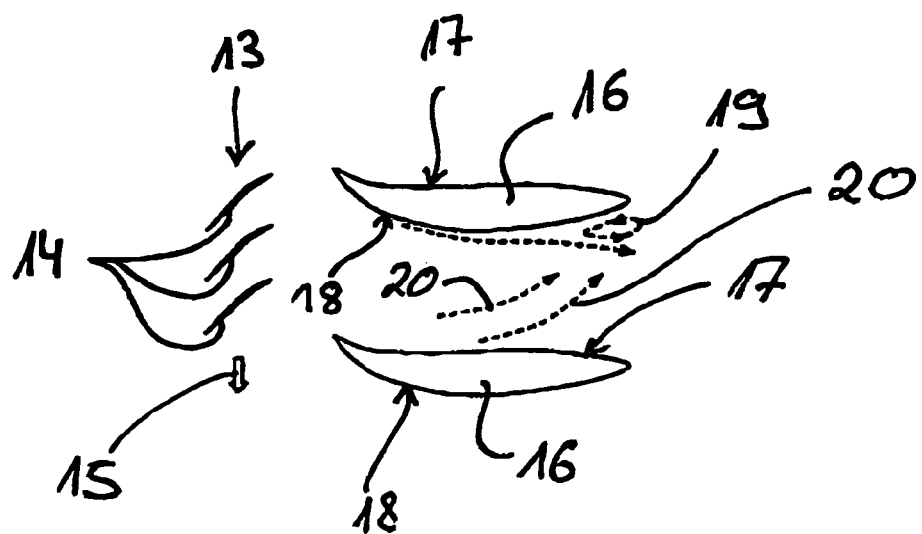
FIG. 2 a cross section through the flow structure of FIG. 1 in the area of a hub, as is known from the prior art.

FIGS. 1 and 2 show a flow structure such as that known in the prior art in a highly schematic form for installation in a transitional channel 10 between a medium-pressure compressor 11 and/or a low-pressure compressor and a high-pressure compressor 12 of an aircraft engine designed as a gas turbine, whereby a gas flow is guided through the transitional channel 10 from the medium-pressure compressor 11 and/or the low-pressure compressor into the area of the high-pressure compressor 12. FIG. 1 shows in a highly schematic form that the medium-pressure compressor 11 is closed off by a rotor blade ring 13 in the area of its last compressor stage as seen in the direction of flow. FIG. 2 shows that the rotor blade ring 13 is formed by multiple rotor blades 14 spaced a distance apart in the circumferential direction, the direction of rotation of the rotor blade ring 13 being indicated by the arrow 15.

As shown by FIG. 2 in particular, it is already known from the prior art to provide multiple supporting ribs 16 spaced a distance apart in the circumferential direction of the transitional channel 10. The supporting ribs are designed to be relatively thick and relatively long and have a small height ratio. According to FIG. 2, it is already known from the prior art to design the supporting ribs 16 as flow-guiding supporting ribs and thus to contour their side faces in the sense of a pressure side 17 and a suction side 18. With such flow-guiding supporting ribs 16, there is the risk of flow separation and the risk of development of secondary flows, the flow separation being indicated by arrows 19 in FIG. 2 and the secondary flows being indicated by arrows 20. Such flow separation and secondary flow have a negative effect on the efficiency of the gas turbine and thus are a disadvantage on the whole.

Figure 3:
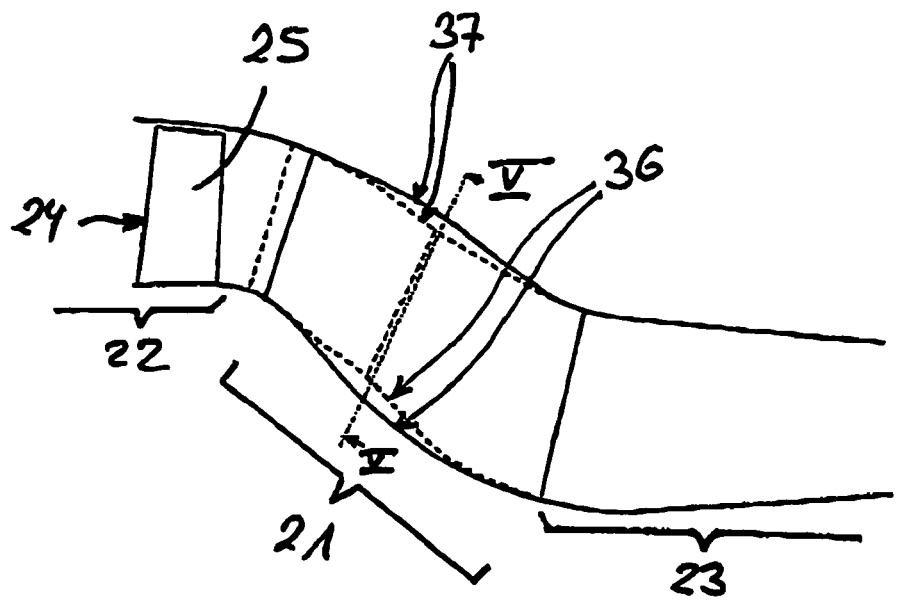
FIG. 3 a highly schematic diagram of an inventive flow structure for a gas turbine, namely a flow structure for a transitional channel between two compressor stages.
Figure 4:
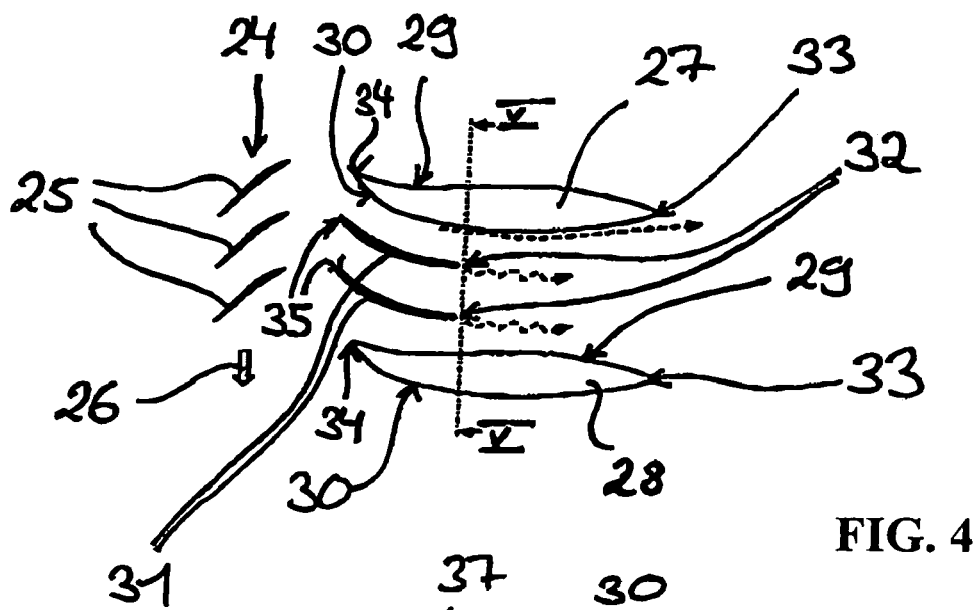
FIG. 4 a cross section through the inventive flow structure of FIG. 3 in the area of a hub.
Figure 5:
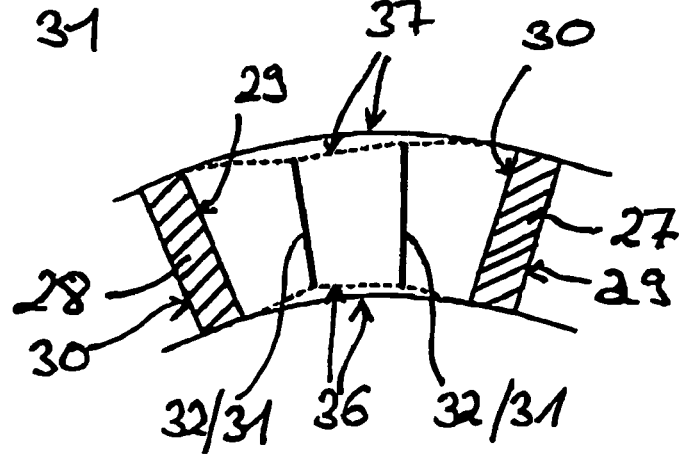
FIG. 5 a cross section through the inventive flow structure of FIGS. 3 and 4 in the direction of section V-V.

FIGS. 3 to 5 show a preferred exemplary embodiment of an inventive flow structure for a gas turbine in the area of a transitional channel 21 between a medium-pressure compressor 22 and/or a low-pressure compressor and a high-pressure compressor 23, whereby according to FIG. 3 the medium-pressure compressor 22 positioned upstream from the transitional channel 21 in the direction of flow is closed off in turn by rotor blade ring 24 in the area of its last stage. The rotor blade ring 24 includes according to FIG. 4 several rotor blades 25 which are spaced a distance apart in the circumferential direction, whereby the direction of rotation of the rotor blade ring 24 and/or the rotor blades 25 is indicated by an arrow 26. In the area of the transitional channel 21 supporting ribs 27 and/or 28 spaced a distance apart in the circumferential direction are in turn arranged in the area of the transitional channel 21, with the supporting ribs 27 and/or 28 having a pressure side 29 and a suction side 30 and thus being designed to guide the flow.

In the sense of the present invention, it is now proposed that at least one guide vane and/or guide rib 31 should be positioned between two adjacent supporting ribs 27 and/or 28 that are spaced a distance apart in the circumferential direction. In the exemplary embodiment in FIGS. 3 through 5, two guide ribs 31 are arranged between the adjacent supporting ribs 27 and 28. In the sense of the present invention, it is proposed here that the guide ribs 31 should be arranged between the supporting ribs 27, 28 in such a way that flow outlet edges 32 of the guide ribs 31 run upstream from the flow outlet edges 33 of the guide ribs 27 and/or 28. The flow outlet edges 32 of the guide ribs 31 run in an area which is situated between 30% and 50% of the chord length of the supporting ribs 27 and/or 28 starting from a flow inlet edge 34 of the supporting ribs 27 and/or 28. The guide ribs 31 are thus designed to be relatively short with respect to the supporting ribs 27 and 28.

In the sense of the present invention, it is also proposed that the guide ribs 31 should be positioned between the supporting ribs 27 and 28 so that the flow inlet edges 35 of the guide ribs 31 are situated slightly upstream from the flow inlet edges 34 of the supporting ribs 27 and 28. The flow inlet edges 34 of the supporting ribs 27 and/or 28 run in an area between 5% and 10% of the chord length of the guide ribs 31 starting from the flow inlet edges 35 of the guide ribs 31.

In addition, it is within the sense of the present invention to contour the walls of the transitional channel 21 accordingly to optimize the flow conditions. For example, it can be seen from FIGS. 3 and 5 in particular that the transitional channel 21 is bordered on the hub end by a channel wall 36 that is on the inside radially and at the housing end by a channel wall 37 but is on the outside radially. In the sense of the present invention, the channel walls 37 and 36 are then contoured so that they are constricted inward in the area of the flow outlet edge 32 of the guide ribs 31, thereby constricting the flow cross section. The channel walls 36 and 37 here assume the contour shown with dotted lines in FIGS. 3 and 5.

It can be seen from FIG. 5 in particular that the channel walls 36 and 37 are constricted inward to a lesser extent in the area adjacent to the suction side 30 than adjacent to the pressure side 29. This results in a non-rotationally symmetrical contour of the channel walls 36 and 37 in the circumferential direction which is especially preferred with respect to optimization of flow.

In the sense of the present invention, it is therefore proposed that at least one relatively short guide rib 31 be positioned between two neighboring supporting ribs 27, 28, with the guide ribs 31 being designed to be relatively short and relatively thin in comparison with the supporting ribs 27, 28. The flow inlet edges 35 of the guide ribs 31 are arranged slightly upstream from the flow inlet edges 34 of the supporting ribs 27, 28, but the flow outlet edges 32 of the guide ribs 31 run definitely upstream from the flow outlet edges 33 of the supporting ribs 27, 28. The chord length of the guide ribs 31 amounts to approximately 30% to 50% of the chord length of the supporting ribs 27, 28. Channel walls 36 and 37 of the transitional channel 21 are constricted inward in the area of the flow outlet edges 32 of the guide ribs 31. This results in a side wall contour of the transitional channel that is not rotationally symmetrical in the circumferential direction.

The inventive flow structure is used either between two compressors or two turbines or downstream from the low-pressure turbine in the case of the turbine outlet housing. Use of the inventive flow structure in a transitional channel between a medium-pressure compressor and a high-pressure compressor and/or in a transitional channel between a high-pressure turbine and a low-pressure turbine as well as downstream from the low-pressure turbine of an aircraft engine are preferred. Use of the flow structure is especially preferred when a medium-pressure compressor and/or a low-pressure compressor positioned upstream from the transitional channel is terminated by a rotor blade ring at the last stage as seen in the direction of flow, i.e., on the downstream stage. The design length can then be shortened in this way. However, it is also conceivable to use the inventive flow structure if the compressor positioned upstream from same ends with a vane ring.

The inventive flow structure can be manufactured relatively inexpensively as a cast component. Flow losses in the transitional channel are greatly reduced. The so-called outlet guide wheel in the case of the compressor in contact with flow, the outlet guide wheel with the low pressure turbine in contact with the flow or the inlet guide wheel in the low-pressure turbine may thus be eliminated. This results in more compact and lightweight designs. Thus the efficiency of the gas turbine can be effectively increased.

LIST OF REFERENCE NUMBERS

10 Transitional channel
11 Medium-pressure compressor
12 High-pressure compressor
13 Rotor blade ring
14 Rotor blade
15 Direction of rotation
16 Supporting rib
17 Pressure side
18 Suction side
19 Flow separation
20 Secondary flow
21 Transitional channel
22 Medium-pressure compressor
23 High-pressure compressor
24 Rotor blade ring
25 Rotor blade
26 Direction of rotation
27 Supporting rib
28 Supporting rib
29 Pressure side
30 Suction side
31 Guide rib
32 Flow outlet edge
33 Flow outlet edge
34 Flow inlet edge
35 Flow inlet edge
36 Channel wall
37 Channel wall The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flow structure for a gas turbine, in particular for an aircraft engine, in a transitional channel between two compressors or in a transitional channel between two turbines or in a transitional channel of a turbine outlet housing downstream from a low-pressure turbine, wherein the transitional channel comprises an inner wall and an outer wall with supporting ribs positioned in and extending across the transitional channel from the inner wall to the outer wall and arranged so they are spaced a distance apart in a circumferential direction of the transitional channel, wherein at least one guide vane and/or guide rib is positioned between two adjacent supporting ribs which are spaced a distance apart in the circumferential direction of the transitional channel, and wherein a flow outlet edge of the guide rib runs upstream from a flow outlet edge of the supporting ribs, and wherein further the flow outlet edge of the guide rib runs downstream from a flow inlet edge of the supporting ribs.

2. The flow structure according to claim 1, wherein the flow outlet edge of the guide rib runs starting from the flow inlet edge of the supporting ribs in an area between 30% and 50% of a chord length of the supporting ribs.

3. The flow structure according to claim 1, wherein a flow inlet edge of the guide rib runs upstream from the flow inlet edge of the supporting ribs.

4. The flow structure according to claim 3, wherein the flow inlet edge of the supporting ribs run from the flow inlet edge of the guide rib in an area between 5% and 10% of a chord length of the guide rib.

5. The flow structure according to claim 1, wherein the guide rib is relatively short and slender in comparison with the supporting ribs.

6. The flow structure according to claim 1, wherein the supporting ribs have a suction side and a pressure side, guiding a flow.

7. The flow structure according to claim 1, wherein an inner channel wall which borders the transitional channel on an inside radially and/or an outer channel wall which borders the transitional channel on an outside radially is constricted inward in an area of the flow outlet edge of the guide rib between two adjacent supporting ribs.

8. The flow structure according to claim 7, wherein the inner channel wall and/or the outer channel wall is constricted to a greater extent between two adjacent supporting ribs in an area of a pressure side of an adjacent supporting rib than in an area of a suction side of an adjacent supporting rib.

9. The flow structure according to claim 1, wherein the flow structure is positioned in a transitional channel between two compressors, in particular in a transitional channel between a medium-pressure compressor and/or a low-pressure compressor and a high-pressure compressor.

10. The flow structure according to claim 9, wherein the medium-pressure compressor and/or the low-pressure compressor is positioned upstream from the transitional channel, with the medium-pressure compressor and/or the low-pressure compressor ending at a downstream end with a rotor blade ring.

11. The flow structure according to claim 9, wherein the medium-pressure compressor and/or the low-pressure compressor is positioned upstream from the transitional channel, with the medium-pressure compressor and/or the low-pressure compressor ending with a guide vane ring on a downstream end.

12. The flow structure according to claim 1, wherein the flow structure is positioned in a transitional channel between two turbines, in particular in a transitional channel between a high-pressure turbine and a low-pressure turbine.

13. The flow structure according to claim 12, wherein the high-pressure turbine is positioned upstream from the transitional channel, the high-pressure turbine ending with a rotor blade ring on a downstream end.

14. The flow structure according to claim 1, wherein the flow structure is positioned in a transitional channel of a turbine outlet housing downstream from a low-pressure turbine.

15. The flow structure according to claim 1 wherein the guide rib extends from the inner wall to the outer wall of the transitional channel.

16. A flow structure for a gas turbine, comprising:
 a transitional flow channel between a first component of the gas turbine and a second component of the gas turbine, wherein the transitional flow channel comprises an inner wall and an outer wall;
 a first supporting rib and a second supporting rib positioned a distance apart in a circumferential direction in the transitional flow channel and extending from the inner wall to the outer wall of the transitional flow channel; and
 a guide rib positioned between the first and second supporting rib, wherein a flow outlet edge of the guide rib runs downstream from a flow inlet edge of the first and second supporting ribs, and wherein the flow outlet edge of the guide rib is positioned upstream from a flow outlet edge of the first and second supporting ribs.

17. The flow structure according to claim 16 wherein a flow inlet edge of the guide rib is positioned upstream from the flow inlet edge of the first and second supporting ribs.

18. The flow structure according to claim 17 wherein the flow inlet edge of the first and second supporting ribs is located adjacent to a position on the guide rib which is between 5-10% of a length of the guide rib.

19. The flow structure according to claim 16 wherein the flow outlet edge of the guide rib is located adjacent to a position on the first and second supporting ribs which is between 30-50% of a length of the supporting ribs.

20. The flow structure according to claim 16 wherein a channel wall that defines a portion of the transitional flow channel is constricted in an inward direction in an area of the flow outlet edge of the guide rib.

21. The flow structure according to claim 16 wherein the guide rib extends from the inner wall to the outer wall of the transitional flow channel.

* * * * *